United States Patent [19]

Busse

[11] Patent Number: 5,044,808
[45] Date of Patent: Sep. 3, 1991

[54] STEERING ROD FOR MOTOR VEHICLES
[75] Inventor: Fritz Busse, Hilden, Fed. Rep. of Germany
[73] Assignee: TRW Ehrenreich GmbH & Co. KG, Dusseldorf, Fed. Rep. of Germany
[21] Appl. No.: 395,252
[22] Filed: Aug. 17, 1989
[30] Foreign Application Priority Data Aug. 17, 1988 [DE] Fed. Rep. of Germany ....... 3827854

[51] Int. Cl.$^5$ ............................................ F16D 9/00
[52] U.S. Cl. ............................................ 403/2; 403/77; 285/2
[58] Field of Search ............... 403/2, 77; 285/2, 3, 285/4

[56] References Cited

U.S. PATENT DOCUMENTS

| 1,839,690 | 1/1932 | Malinowski | 285/2 |
| 1,982,915 | 12/1934 | Jenks | 285/3 |
| 2,602,513 | 7/1952 | Conrad et al. | 285/4 X |
| 2,757,028 | 7/1956 | Latzen . | |
| 4,064,953 | 12/1977 | Collins | 285/3 X |
| 4,066,149 | 1/1978 | Mazelsky . | |
| 4,657,424 | 4/1987 | Dong . | |

FOREIGN PATENT DOCUMENTS 2439095 10/1979 France .
1275207 4/1971 United Kingdom .
2094729A 3/1982 United Kingdom .

Primary Examiner—Andrew V. Kundrat
Attorney, Agent, or Firm—Tarolli, Sundheim & Covell

[57] ABSTRACT

A steering rod for motor vehicles includes a guide rod or a cross guide. After an overload by a tension force, the steering rod changes geometrically to clearly influence the driving behavior of a motor vehicle. For this purpose, the steering rod has a transmission rod (2) set into a pipe (1) for the transmission of tension forces. The transmission rod (2) at one end is held into the pipe (1) by a force-fitting or form-fitting holding device, and at the other end projects out of the pipe end (11). The transmission rod (2) has, between the holding device and the pipe end (11) a desired breaking point (9). An offset (10) is located between the desired breaking point (9) and the pipe end (11). The pipe (1) is provided, between the offset (10) and the pipe end (11), with a pipe narrowing which forms a stop (12) for the offset (10) in case of rupture of the desired breaking point (9).

27 Claims, 1 Drawing Sheet

STEERING ROD FOR MOTOR VEHICLES

TECHNICAL FIELD

The subject of the invention is a steering rod for motor vehicles. The steering rod includes a guide rod or a cross guide in pipe form with a transmission rod set into the pipe for the transmission of tension forces. The transmission rod at one end is held in the pipe by a force-fitting or form-fitting holding device and at the other end projects out of the pipe.

BACKGROUND ART

In a steering rod of this kind, the guide rods or cross guides are safety parts which must not be so damaged by overload that in later operation they fail and may cause dangerous situations. It must also be assured that through such guide rods and cross guides, no uncontrolled high loads are transmitted which would lead to not clearly perceptible starting damage in connecting parts important to safety. For this reason, guide rod parts have been designed so that overloads, before a break or separation of material, would lead to such permanent deformation of the part that the overload which had taken place would be clearly perceptible to the user in the driving or steering behavior of the vehicle. Thus, pressure-stressed guide rod parts have been designed as bend struts which, at a definite pressure load, would bend away without separation of the part. Guide rod parts have also been pre-bent so that with too great a pressure load, they would bend farther and a clearly perceptible deformation would result in the driving behavior. In the case of guide rod parts which might be overstressed through a tension load, however, no comparable overload safety devices have become known.

However, from U.S. Pat. No. 2,757,028 is known a steering rod for motor vehicles. The steering rod has a guide rod of which the end engages in a tubular section of the same guide rod. A cylindrical rubber sleeve is set as shock damper between these two construction parts so as to absorb brief shocks as well as wheel vibrations.

SUMMARY OF THE INVENTION

Based on this, the invention addresses the problem of improving a steering rod with a guide rod or cross guide so that a tension overload causes a definite deformation of the guide rod or cross guide clearly perceptible in driving behavior of the motor vehicle.

One technical solution of this problem consists of the fact that the transmission rod between a holding device and a pipe end has a desired break point. An offset is located between the desired break point and the end of the pipe. The pipe between the offset and the end of the pipe is provided with a narrowing of the pipe which forms a stop for the offset in case of a rupture of the desired breaking point to prevent a complete separation of the part.

In a steering rod according to the invention, the tension force is transmitted by the guide rod or cross guide through the transmission rod. In case of a tension force exceeding a certain limit load, the desired breaking point ruptures. Then the transmission rod, under a constant tension load, moves with its offset to the narrowing of the pipe by which the tension force can continue to be transmitted between the transmission rod and the pipe. The change in length of the device, however, leads to such a marked change in geometry of the steering rod that any driver is clearly forewarned by the driving behavior of the vehicle.

Thus, the steering rod according to the invention has the advantage that an overload which has taken place is clearly perceptible in the driving behavior so that the user is alerted to the need of repair of the steering rod before it finally fails as a result of the overload and a dangerous situation results.

Another technical solution consists, in the case of a transmission rod set into the pipe for the transmission of tension forces, also of the fact that the transmission rod is held in the pipe at both ends by force-fitting or form-fitting holding devices. The transmission rod bridges over a separation crack in the pipe between the holding devices, and has between one of the holding devices and the separation crack a desired breaking point. An offset is located between the desired breaking point and the separation crack. The pipe is provided, between the offset and the separation crack, with the narrowing of the pipe which forms a stop for the offset in case of rupture of the desired breaking point.

In this second solution, the tension force acts on the ends of the pipe. The transmission rod bridges over the separation crack of the pipe in two parts while it transmits the tension force between the two holding devices. If the two-part pipe is tension-stressed with the limit load or beyond in this device also, the desired breaking point ruptures. Under a constant tension load, the offset of the transmission rod moves to the pipe narrowing while the separation crack of the pipe pulls apart and the pipe is lengthened by a definite distance. This provides, in turn, a change of the geometry of the steering rod, which can be perceived by the driver in a changed driving behavior of the vehicle before the steering rod becomes fully unfit for operation.

The desired breaking point may be produced by a suitable local change of the material properties of the transmission rod. In one preferred embodiment, however, the desired breaking point can be a thinner part of the transmission rod so that it can be simply worked by lathe.

In another embodiment, the pipe has, between an offset and a pipe end or separation crack, a guide for the transmission rod. The transmission rod forms, even with the desired breaking point ruptured, a straight line extension of the guide rod or cross guide. In this way, there is a normal steering behavior even after the rupture of the desired breaking point. Here, the transmission rod has, preferably between the guide and the pipe end or separation crack or other pipe openings, sealing rings for sealing against the inner wall of the pipe. This is so that moisture or dirt cannot penetrate into the guide and through corrosion influence the limit load crucial to the desired break.

In another embodiment, the form-fitting holding device is a thickening of the transmission rod supporting against the tension force at a narrowing of the pipe. When the transmission rod bridges over a separation crack of the pipe, there may be provided on both sides of the separation crack, thickenings of the transmission rod supported against narrowings of the pipe. When the transmission rod projects out of the end of the pipe for the transmission of tension forces, it has, preferably between the narrowing of the pipe and the end of the pipe, another form-fitting holding device which is another pipe thickening of the transmission rod supporting against a pressure force at another narrowing of the pipe. This is so that before the desired break, pressure forces can also be transmitted, free of play, between the pipe and the transmission rod. This purpose is attained when the form-fitting holding device is a thickening of the transmission rod supporting also against a pressure force at a narrowing of the pipe, because then the same thickening can transmit both tension and pressure forces.

In another embodiment, the force-fitting holding device is a pressing connection between the pipe and the transmission rod. The pressing connection can be produced easily by radially pressing in zones of the pipe against the transmission rod. The pressing connection should be so dimensioned that it can absorb a tension load exceeding the limit load for the desired break.

With a thickening of the transmission rod supported against a narrowing of the pipe, or a pressing connection between pipe and transmission rod, a threaded section projecting out of the pipe end of a guide rod may be screwed to a jointed shaft of a guide rod joint. This makes possible an adjustability of the guide.

In another embodiment, the form-fitting holding device is a threaded connection between pipe and transmission rod. The threaded connection makes possible an adjustment of the transmission rod within the pipe. With a transmission rod having a threaded connection projecting out of the pipe end of a guide rod for the transmission of tension forces, the transmission rod is preferably, at the same time, a jointed shaft of a guide rod joint connected with the guide rod so that the guide can be set in by screwing the threaded connection.

BRIEF DESCRIPTION OF THE DRAWINGS

Other details and advantages of the subject of the invention appear from the description which follows of the respective drawing which shows three embodiments of a pipe connection according to the invention.

DESCRIPTION OF PREFERRED EMBODIMENTS

Figure 1:
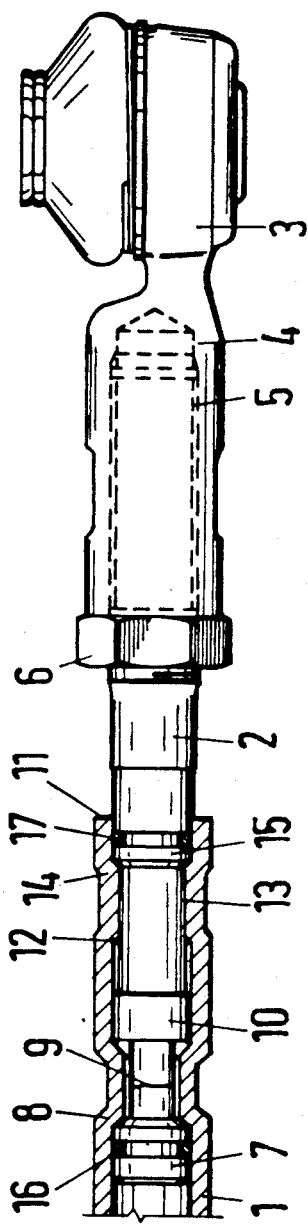
FIG. 1 shows a guide rod with a transmission rod projecting out of a pipe end and screwed to a joint shaft and having thickenings for support against pipe narrowings, in longitudinal section.

FIG. 1 shows a guide rod, designed as a pipe 1, which is connected through a transmission rod 2 with a guide rod joint 3. A jointed shaft 4 adjustable in length is screwed to a threaded shaft 5 of the transmission rod 2 and is secured by means of a counter-nut 6.

The transmission rod 2 has a cylindrical thickening which fits into the inner diameter of the pipe 1 and which, under a tension load, is supported against an inner edge of a pipe narrowing 8.

To the thickening 7 is connected a desired breaking point 9 of which the diameter size corresponds to the strength of the material and the required breaking load.

To the desired breaking point 9 adjoins a cylindrical offset 10 of which the diameter, again, corresponds approximately to the inner diameter of the pipe 1.

Between the offset 10 and one end 11 of the pipe, the pipe 1 is provided with a narrowing which forms a stop 12 for the offset 10, and at the same time, a guide 13 for the transmission rod 2. The pipe narrowing may, for example, be produced by a tool pressed on from outside. At the same time, it forms another pipe narrowing 14 against which is supported another cylindrical thickening 15 of the transmission rod 2 under a pressure load.

When the desired breaking point ruptures with the exceeding of a limit load, the offset 10 in the pipe 1 is moved to the stop 12 by which the guide and the driving behavior of the vehicle are changed. Before the desired breaking point 9 ruptures, the transmission rod 2 is definitely fixed in its position relative to the pipe by the thickenings 7, 15.

The thickenings 7, 15 have circumferential grooves into which are set sealing rings 16, 17 lying against the inner wall of the pipe. This arrangement, in particular, prevents a solid corrosion of the transmission rod 2 at the pipe narrowings 8, 14 as well as the guide 13 and the inner wall of the pipe.

Figure 2:
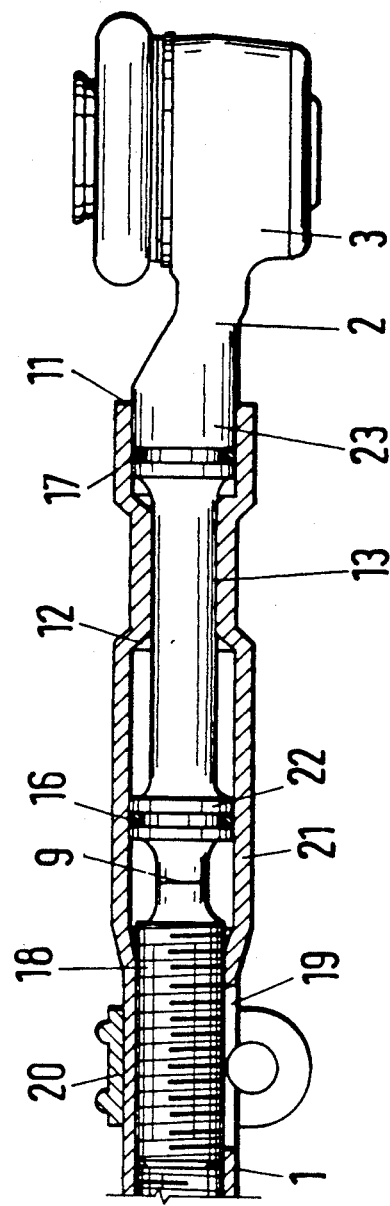
FIG. 2 shows a guide rod with a transmission rod projecting out of a pipe end and forming a jointed shaft and having a joint connection with a pipe, in longitudinal section.

FIG. 2 shows the pipe 1 of a guide rod into which is set the one transmission rod 2. At the same time, the transmission rod 2 forms the jointed shaft of a guide rod joint 3 and is held into the pipe 1 by a threaded connection 18. In the region of the threaded connection 18, the pipe 1 has a lengthwise slit 19 so that the threaded connection 18, after inserting the guide, can be easily secured by means of a clamping shell 20.

To the threaded connection 18 adjoins a desired breaking point 9. In this region, the pipe 1 has a widening 21 which serves, at the same time, to receive a cylindrical offset 22. After setting in the transmission rod 2, the pipe is compressed, between offset 22 and the pipe end 11, to a cylinder or polygon to form a pipe narrowing with a stop 12 and a guide 13. The pipe narrowing is produced to make possible the rotation and lengthwise displacement of the transmission rod 2 in the pipe 1 so as to assure the adjusting of the guide and its extension in case of rupture at the desired breaking point 9. In case of overload, the offset 22 of the transmission rod 2, torn at the desired breaking point 9, lies against the stop 12 so that the desired change of geometry of the steering rod occurs.

Near the pipe end 11, the transmission rod 2 adjoins with a cylindrical thickening 23 against the inner wall of the pipe. Sealing rings 16, 17 which protect the guide 13, in particular, against corrosion are set into circumferential grooves of the offset 22 and the thickening 23.

Figure 3:
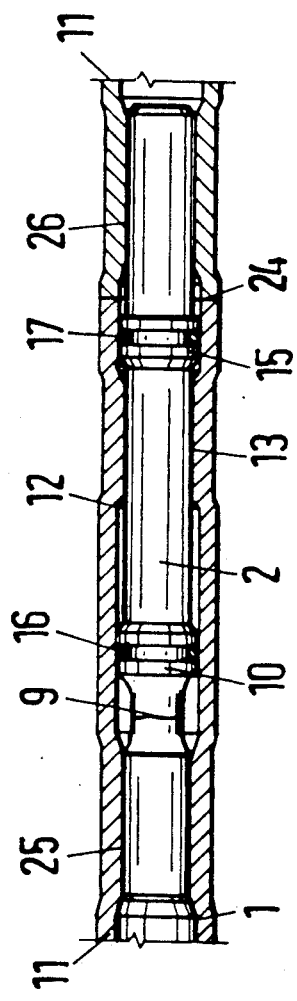
FIG. 3 shows a guide rod or cross guide with a transmission rod bridging over a separation crack and having a pressing connection with a pipe at both ends, in longitudinal section.

Finally, FIG. 3 shows a guide rod or cross guide of which the pipe 1 is in two parts. The pipe parts adjoin bluntly at a separation crack 24. A tension force may be read at the pipe end 11. The separation crack 24 is bridged over by a transmission rod 2 set completely into the pipe 1. For this purpose, the transmission rod 2 is connected at both ends by means of pressing connections 25, 26 with the pipe 1. The pressing connections 25, 26 are arranged on both sides of the separation crack 24. The pressing connections 25, 26 may be produced by cylindrical or polygonal compression of the pipe 1 and are dimensioned so as to absorb all pressure and tension loads and to transmit higher loads than a desired breaking point 9.

The desired breaking point 9 is formed between the pressure connection 25 and the separation crack 24. The desired breaking point 9 is adjoined by a cylindrical offset 10 which, with rupture of the desired breaking point 9, can be moved up to stop 12. The stop 12 is of a pipe construction which forms at the same time a guide 13. After the occurrence of an overload, the separation crack 24 moves apart at once, and the desired change of the steering rod geometry occurs. A necessary condition for this is that the pipe narrowing, also produced by radial pressing in of the pipe wall, makes possible an axial movement of the transmission rod 2.

The guide 13 is adjoined by a cylindrical thickening 15 of the transmission rod 2. The thickening 15 serves, in particular, as a support for a sealing ring 17. The sealing ring 17 together with a sealing ring 16 of the offset 10 provides for freedom from corrosion in the region of the guide 13, and assures a limit load, of close tolerance, for the rupture of the desired breaking point 9. The desired breaking points 9 of the embodiments described are so dimensioned that they withstand, unharmed, the loads usual in operation of about 10% of the loads which may occur in an accident.

Having described preferred embodiments of the invention, I claim:

1. A steering rod for motor vehicles comprising a guide rod or cross guide in pipe form, and a transmission rod inserted into the pipe for the transmission of tension forces, one end of the transmission rod being held in the pipe by a force-locking holding device and the other end projecting out of the pipe, with the distinction that the transmission rod (2) has a breaking point (9) between the holding device and the pipe end (11), and an offset (10, 22) between the breaking point (9) and the pipe end (11), the pipe (1), between the offset (10, 22) and the pipe end (11), being provided with a pipe narrowing which forms a stop (12) for the offset (10, 22) in case of rupture of the breaking point (9).

2. A steering rod for motor vehicles comprising a guide rod or cross guide in pipe form, and a transmission rod inserted into the pipe for the transmission of tension forces, one end of the transmission rod being held in the pipe by a form-locking holding device and the other end projecting out of the pipe, with the distinction that the transmission rod (2) has a breaking point (9) between the holding device and the pipe and (11), and an offset (10, 22) between the breaking point (9) and the pipe end (11), the pipe (1), between the offset (10, 22) and the pipe end (11), being provided with a pipe narrowing which forms a stop (12) for the offset (10, 22) in case of rupture of the breaking point (9).

3. A steering rod for motor vehicles comprising a guide rod or a cross guide in pipe form, and a transmission rod set into the pipe for the transmission of tension forces, with the distinction that the transmission rod (2) is held in the pipe at both ends by force-locking holding devices and bridges over a separation crack (24) of the pipe (1) formed between the holding devices, the transmission rod (2) having a breaking point (9) between one of the holding devices and the separation crack (24), and an offset (10) between the breaking point (9) and the separation crack (24), the pipe (1), between the offset (10) and the separation crack (24), being provided with a pipe narrowing which forms a stop (12) for the offset (10) in case of the rupture of the breaking point (9).

4. A steering rod for motor vehicles comprising a guide rod or a cross guide in pipe form, and a transmission rod set into the pipe for the transmission of tension forces, with the distinction that the transmission rod (2) is held in the pipe at both ends by form-locking holding devices and bridges over a separation crack (24) of the pipe (1) formed between the holding devices, the transmission rod (2) having a breaking point (9) between one of the holding devices and the separation crack (24), and an offset (10) between the breaking point (9) and the separation crack (24), the pipe (1), between the offset (10) and the separation crack (24), being provided with a pipe narrowing which forms a stop (12) for the offset (10) in case of the rupture of the breaking point (9).

5. A steering rod according to claim 1, with the distinction that the breaking point (9) is formed as a narrowing of the transmission rod (2).

6. A steering rod according to claim 1, with the distinction that the pipe (1) has, between the offset (10, 22) and the pipe end (11), a guide (13) for the transmission rod (2).

7. A steering rod according to claim 3, with the distinction that the pipe (1) has, between the offset (10, 22) and the separation crack (24), a guide (13) for the transmission rod (2).

8. A steering rod according to claim 6, with the distinction that the transmission rod (2) has, between the guide (13) and the pipe end (11), sealing rings (16, 17) for sealing against the inner wall of the pipe.

9. A steering rod according to claim 7, with the distinction that the transmission rod (2) has, between the guide (13) and the separation crack (24), sealing rings (16, 17) for sealing against the inner wall of the pipe.

10. A steering rod according to claim 6, with the distinction that the transmission rod (2) has, between the guide (13) and other pipe openings (19), sealing rings (16, 17) for sealing against the inner wall of the pipe.

11. A steering rod according to claim 2, with the distinction that the form-locking device is a thickening (7) of the transmission rod (2) supported against a pipe narrowing (8) against a tension force.

12. A steering rod according to claim 11, with the distinction that the transmission rod (2) has, between the pipe narrowing and the pipe end (11), another form-locking holding device which is another thickening (15) of the transmission rod (2) supported against another pipe narrowing (14) against a pressure force.

13. A steering rod according to claim 12, with the distinction that the form-locking holding device is a threaded connection (18) between the pipe (1) and transmission rod (2).

14. A steering rod according to claim 1, with the distinction that the force-locking holding device is a pressure connection (25, 26) between the pipe (1) and the transmission rod (2).

15. A steering rod according to claim 1, with the distinction that the transmission rod (2) is screwed to a threaded section (5) projecting out of the pipe end (11) of a guide rod with a jointed shaft (4) of a guide rod joint (3).

16. A steering rod according to claim 15, with the distinction that in the guide rod, the transmission rod (2) is at the same time a jointed shaft of a guide rod joint (3) connected with the guide rod.

17. A steering rod for use in a motor vehicle, said steering rod comprising:
   a guide member being in the form of a pipe;
   a transmission rod inserted into said pipe for the transmission of tension forces, a holding device holding one end of said transmission rod in said pipe and the other end of said transmission rod projecting out of said pipe;
   said transmission rod having a narrowed portion defining a breaking point thereof between said holding device and an end of said pipe, said transmission rod including an enlarged portion located between the breaking point and said end of said pipe, the portion of said pipe located between said enlarged portion and said end of said pipe having a stop which engages said enlarged portion to block the part of said transmission rod having said enlarged portion from exiting from said pipe when the breaking point breaks.

18. A steering rod for use in a motor vehicle, said steering rod comprising:
   a guide member in the form of a pipe;
   a transmission rod inserted into said pipe for the transmission of tension forces;
   holding means for holding one end of said transmission rod in said pipe, the other end of said transmission rod projecting out of said pipe;
   said transmission rod having a narrowed portion located between said holding means and an end of said pipe, said transmission rod including an enlarged portion located between the narrowed portion and said end of said pipe, the portion of said pipe located between said enlarged portion and said end of said pipe having a stop which engages said enlarged portion to block the part of said transmission rod having said enlarged portion from exiting from said pipe when the narrowed portion breaks.

19. A steering rod according to claim 18 wherein said holding means creates a frictional force acting between said transmission rod and said pipe resisting relative movement of said transmission rod and said pipe.

20. A steering rod according to claim 18 wherein said holding means is a threaded connection between said transmission rod and said pipe.

21. A steering rod according to claim 2, with the distinction that the breaking point (9) is formed as a narrowing of the transmission rod (2).

22. A steering rod according to claim 2, with the distinction that the pipe (1) has, between the offset (10, 22) and the pipe end (11), a guide (13) for the transmission rod (2).

23. A steering rod according to claim 4, with the distinction that the pipe (1) has, between the offset (10, 22) and the separation crack (24), a guide (13) for the transmission rod (2).

24. A steering rod according to claim 7, with the distinction that the transmission rod (2) has, between the guide (13) and other pipe openings (19), sealing rings (16, 17) for sealing against the inner wall of the pipe.

25. A steering rod according to claim 4, with the distinction that the form-locking device is a thickening (7) of the transmission rod (2) supported against a pipe narrowing (8) against a tension force.

26. A steering rod according to claim 3, with the distinction that the force-locking holding device is a pressure connection (25, 26) between the pipe (1) and the transmission rod (2).

27. A steering rod according to claim 2, with the distinction that the transmission rod (2) is screwed to a threaded section (5) projecting out of the pipe end (11) of a guide rod with a jointed shaft (4) of a guide rod joint (3).

* * * * *

UNITED STATES PATENT AND TRADEMARK OFFICE
CERTIFICATE OF CORRECTION

PATENT NO. : 5,044,808

DATED : September 3, 1991

INVENTOR(S) : Fritz Busse

It is certified that error appears in the above-identified patent and that said Letters Patent is hereby corrected as shown below:

Column 5, Line 41, Claim 2, change "and" (second occurrence) to --end--.

Signed and Sealed this

Twenty-second Day of December, 1992

*Attest:*

DOUGLAS B. COMER

*Attesting Officer*      *Acting Commissioner of Patents and Trademarks*